US012790452B2

(12) United States Patent
Nagamatsu et al.

(10) Patent No.: US 12,790,452 B2
(45) Date of Patent: Nov. 10, 2026

(54) POLYMER FILM, LAMINATED FILM, TUBULAR FIXING MEMBER, FIXING DEVICE, AND IMAGE FORMING APPARATUS

(71) Applicant: FUJIFILM Business Innovation Corp., Tokyo (JP)

(72) Inventors: Taiki Nagamatsu, Kanagawa (JP); Masayuki Seko, Kanagawa (JP); Tomotake Inagaki, Kanagawa (JP); Kenji Kajiwara, Kanagawa (JP); Hiroaki Tanaka, Kanagawa (JP); Ryohei Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 564 days.

(21) Appl. No.: 18/451,549

(22) Filed: Aug. 17, 2023

(65) Prior Publication Data

US 2024/0327584 A1 Oct. 3, 2024

(30) Foreign Application Priority Data

Mar. 27, 2023 (JP) ................................ 2023-050298

(51) Int. Cl.
*C08J 7/04* (2020.01)
*C08K 7/06* (2006.01)
*G03G 15/20* (2006.01)

(52) U.S. Cl.
CPC ................. *C08J 7/042* (2013.01); *C08K 7/06* (2013.01); *G03G 15/2057* (2013.01); *G03G 15/206* (2013.01); *C08J 2379/08* (2013.01); *C08K 2201/001* (2013.01); *G03G 2215/2025* (2013.01); *G03G 2215/2038* (2013.01); *G03G 2215/2051* (2013.01)

(58) Field of Classification Search
CPC .. C08J 2379/08; C08K 2201/001; C08K 3/08; C08K 3/22; C08K 3/34; C08K 3/041; C08K 3/28; C08K 3/38; C09D 183/04; C08L 79/08; C08L 25/06
See application file for complete search history.

(56) References Cited

U.S. PATENT DOCUMENTS 3,952,696 A * 4/1976 Saupe ................ G03G 15/2014 399/329
2007/0213446 A1* 9/2007 Feeney ................ C09D 127/06 524/445
2007/0218227 A1* 9/2007 Nishizawa ................ B32B 7/12 428/35.7
2008/0305256 A1* 12/2008 Kimble .................. C01B 25/45 423/641

(Continued)

FOREIGN PATENT DOCUMENTS

JP 06-222695 A 8/1994
JP 2012-225986 A 11/2012

(Continued)

*Primary Examiner* — Mark S Kaucher
(74) *Attorney, Agent, or Firm* — Sughrue Mion, PLLC

(57) ABSTRACT

A polymer film includes at least one type of polymer selected from a resin and fillers dispersed in the polymer, in which an average maximum length of the fillers in a cross section of the polymer film taken in a thickness direction is 10 μm or less, and density of the polymer film is 1.0 g/cm$^3$ or more and 2.0 g/cm$^3$ or less.

18 Claims, 4 Drawing Sheets

(56) References Cited

U.S. PATENT DOCUMENTS

| | | | | |
|---|---|---|---|---|
| 2010/0055365 | A1* | 3/2010 | Nakajima | C08G 73/14<br>428/36.9 |
| 2013/0082369 | A1* | 4/2013 | Kokubo | H10H 20/854<br>524/400 |
| 2018/0113086 | A1* | 4/2018 | Oliver | G01N 33/24 |
| 2021/0166844 | A1* | 6/2021 | Ishikawa | C08G 73/1046 |
| 2022/0404751 | A1* | 12/2022 | Asaka | C08K 3/041 |

FOREIGN PATENT DOCUMENTS

| | | | |
|---|---|---|---|
| JP | 2018-136427 | A | 8/2018 |
| JP | 2022150510 | A * | 10/2022 |

* cited by examiner

POLYMER FILM, LAMINATED FILM, TUBULAR FIXING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2023-050298 filed Mar. 27, 2023.

BACKGROUND

(i) Technical Field

The present disclosure relates to a polymer film, a laminated film, a tubular fixing member, a fixing device, and an image forming apparatus.

(ii) Related Art

JP2012-225986A discloses a belt for fixing that includes a tubular substrate, an elastic layer, and a surface layer. The elastic layer is made of a mixture of a heat-resistant elastomer and a filler, and a thermal effusivity of the belt represented by an equation [(thermal conductivity×density×specific heat capacity)$^{0.5}$] on the basis of the thermal conductivity, the density, and the specific heat capacity of the elastic layer is 1.2 or more.

JP1994-222695A discloses a belt for fixing including a coating layer that has releasability and is provided on an outer circumferential surface of a thin endless belt made of metal and having a thickness of 10 μm to 35 μm and a resin layer that is provided on an inner circumferential surface of the thin endless belt.

JP2018-136427A discloses a thermally conductive polymer material which has a flat plate shape and contains a polymer, a globular substance, and fibers and in which the fibers are oriented in a substantially plane direction.

SUMMARY

Aspects of non-limiting embodiments of the present disclosure relate to a polymer film, a laminated film, a tubular fixing member, a fixing device, and an image forming apparatus that have an excellent thermal conductivity and an excellent heat storage property in a thickness direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspect.

According to an aspect of the present disclosure, there is provided a polymer film including at least one type of polymer selected from a resin and fillers dispersed in the polymer, in which an average maximum length of the fillers in a cross section of the polymer film taken in a thickness direction is 10 μm or less, and density of the polymer film is 1.0 g/cm$^3$ or more and 2.0 g/cm$^3$ or less.

BRIEF DESCRIPTION OF THE DRAWINGS

Exemplary embodiment(s) of the present invention will be described in detail based on the following figures, wherein.

DETAILED DESCRIPTION

Figure 1:
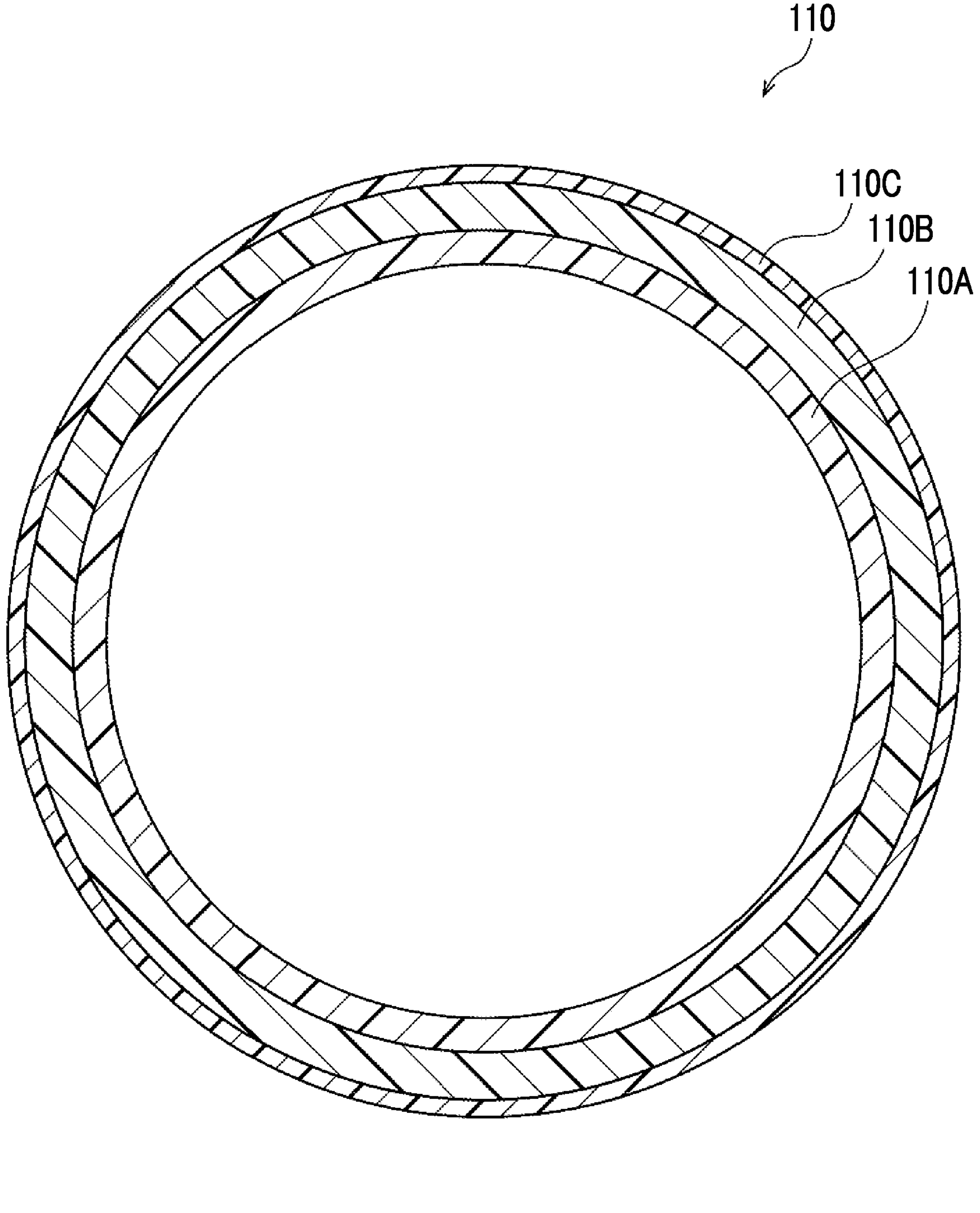
FIG. 1 is a schematic cross-sectional view showing an example of a tubular fixing member according to an exemplary embodiment of the present disclosure.

Exemplary embodiments of the present disclosure will be described below. The description and examples of these exemplary embodiments illustrate the exemplary embodiments and do not limit the scopes of the exemplary embodiments.

A numerical range indicated using "to" in the present disclosure indicates a range that includes numerical values written in the front and rear of "to" as a minimum value and a maximum value, respectively.

With regard to numerical ranges described stepwise in the present disclosure, an upper limit or a lower limit described in one numerical range may be replaced with an upper limit or a lower limit of another numerical range described stepwise. Further, with regard to a numerical range described in the present disclosure, the upper limit or the lower limit of the numerical range may be replaced with values shown in Examples.

In the present disclosure, the term "step" includes not only an independent step but also a step in a case where the intended purpose of the step is achieved even in a case where the step cannot be clearly distinguished from another step.

In the case where an exemplary embodiment is described with reference to the drawings in the present disclosure, the configuration of the exemplary embodiment is not limited to the configuration shown in the drawings. In addition, the sizes of members in each drawing are conceptual, and a relative relationship between the sizes of the members is not limited thereto.

In the present disclosure, each component may include a plurality of types of corresponding substances. In the case where the amount of each component contained in a composition is mentioned in the present disclosure and a plurality of types of substances corresponding to each component are present in the composition, the amount of each component means a total amount of the plurality of types of substances present in the composition unless otherwise specified.

In the present disclosure, "axial direction" of a tubular fixing member means a direction in which a rotation axis of the tubular member extends and "circumferential direction" of the tubular member means a rotation direction of the tubular member.

Polymer Film

The present disclosure provides a first polymer film and a second polymer film. In a case where matters common to the first polymer film and the second polymer film are described, the first polymer film and the second polymer film will be collectively referred to as "polymer films according to an exemplary embodiment of the present disclosure".

The first polymer film is a polymer film that contains at least one type of polymer selected from a resin, and fillers dispersed in the polymer (that is, the resin); and an average maximum length of the fillers in a cross section of the polymer film taken in a thickness direction is 10 μm or less and the density of the polymer film is 1.0 g/cm$^3$ or more and 2.0 g/cm$^3$ or less.

The second polymer film is a polymer film that contains at least one type of polymer selected from rubber, and fillers dispersed in the polymer (that is, the rubber); and an average maximum length of the fillers in a cross section of the polymer film taken in a thickness direction is 10 μm or less and the density of the polymer film is 1.3 g/cm$^3$ or more and 2.6 g/cm$^3$ or less.

A method of obtaining the average maximum length of the fillers of the polymer film according to the exemplary embodiment of the present disclosure will be described.

A cross section of the polymer film taken in the thickness direction is prepared and is observed with a scanning electron microscope (SEM), and 100 fillers are randomly selected. A maximum value of a distance between two arbitrary points positioned on an outline of each filler is measured, and an average value of the maximum values obtained from the 100 fillers is defined as the average maximum length of the fillers.

The density (g/cm$^3$) of the polymer film according to the exemplary embodiment of the present disclosure is a value obtained from the following measurement.

The density of the first polymer film is measured according to an underwater substitution method of JISK7112:1999 "Plastics—Methods of determining the density and relative density of non-cellular plastics". New distilled water that contains 0.1% by mass or less of a wetting agent to remove air bubbles is used as a dipping solution.

The density of the second polymer film is measured according to an "A method" of JISK6268:1998 "vulcanized rubber-density measurement".

In the polymer film according to the exemplary embodiment of the present disclosure, the average maximum length of the fillers in a cross section of the polymer film taken in the thickness direction is 10 μm or less, that is, relatively small fillers are dispersed so that the number density (the number per unit volume) of the fillers is increased and heat transfer between the fillers is facilitated. Accordingly, the polymer film according to the exemplary embodiment of the present disclosure has excellent thermal conductivity. From this viewpoint, the average maximum length of the fillers in a cross section of the polymer film taken in the thickness direction is, for example, preferably 9 μm or less, more preferably 8 μm or less, and still more preferably 7 μm or less.

From the viewpoint of the length of a heat conduction path of one filler, the average maximum length of the fillers in a cross section of the polymer film taken in the thickness direction is, for example, preferably 1 μm or more, more preferably 2 μm or more, and still more preferably 3 μm or more.

In a case where fillers having an appropriate particle diameter or fiber length are selected and used to manufacture the polymer film according to the exemplary embodiment of the present disclosure, the average maximum length of the fillers can be controlled.

In a case where the density of the first polymer film is 1.0 g/cm$^3$ or more, the first polymer film has an excellent heat storage property. From this viewpoint, the density of the first polymer film is, for example, preferably 1.1 g/cm$^3$ or more, more preferably 1.2 g/cm$^3$ or more, and still more preferably 1.3 g/cm$^3$ or more.

However, since the thermal conductivity of a polymer film tends to decrease in a case where the density of the polymer film is too high, the density of the first polymer film is 2.0 g/cm$^3$ or less and is, for example, preferably 1.9 g/cm$^3$ or less and more preferably 1.8 g/cm$^3$ or less.

In a case where the density of the second polymer film is 1.3 g/cm$^3$ or more, the second polymer film has an excellent heat storage property. From this viewpoint, the density of the second polymer film is, for example, preferably 1.4 g/cm$^3$ or more and more preferably 1.5 g/cm$^3$ or more.

However, since the thermal conductivity of the polymer film tends to decrease in a case where the density of the polymer film is too high, the density of the second polymer film is 2.6 g/cm$^3$ or less and is, for example, preferably 2.5 g/cm$^3$ or less and more preferably 2.4 g/cm$^3$ or less.

In a case where a resin or rubber having an appropriate density is selected and used to manufacture the polymer film and the filler content of the polymer film is adjusted to an appropriate range, the density of the polymer film according to the exemplary embodiment of the present disclosure can be controlled.

The first polymer film contains a resin. Examples of the resin include a polyimide resin, a polyamide resin, a polyamideimide resin, a thermotropic liquid crystal polymer, a fluororesin, a silicone resin, a polystyrene resin, and the like. One type of resin may be used alone, or two or more types of resins may be mixed and used. From the viewpoint of the heat resistance of the first polymer film, it is preferable that, for example, a polyimide resin is used as the resin.

Examples of the first polymer film according to the exemplary embodiment include an aspect in which a resin contains a polyimide resin and the density of the polymer film is 1.4 g/cm$^3$ or more and 2.0 g/cm$^3$ or less. In a more preferable aspect of the present exemplary embodiment, the density of the first polymer film is, for example, 1.5 g/cm$^3$ or more and 1.9 g/cm$^3$ or less.

The second polymer film contains rubber. Examples of the rubber include fluororubber, silicone rubber, fluorosilicone rubber, and the like. One type of rubber may be used alone, or two or more types of rubber may be mixed and used. From the viewpoint of the heat resistance of the second polymer film, it is preferable that, for example, silicone rubber is used as the rubber.

From the viewpoint of followability with respect to a contact object, a storage elastic modulus of the second polymer film is, for example, preferably 0.5 MPa or more and 2.5 MPa or less, more preferably 0.8 MPa or more and 2.0 MPa or less, and still more preferably 1.0 MPa or more and 1.8 MPa or less.

A method of measuring the storage elastic modulus (MPa) of the polymer film according to the exemplary embodiment of the present disclosure is as follows.

The polymer film is cut into a rectangular shape having a size of 20 mm×4 mm, and the cut polymer film is used as a sample for measurement. The sample is placed on a dynamic viscoelasticity measuring device; and the dynamic viscoelasticity of the sample is measured under conditions of a temperature of 30° C., a frequency of 10 Hz, a load of 10 gf, and an amplitude of 10 μm to obtain the storage elastic modulus (MPa) of the sample.

The shape of the filler may be any of a particle shape, a fibrous shape, a plate shape, a flake shape, and the like.

From the viewpoint of thermal conductivity, it is preferable that, for example, at least one selected from the group consisting of a carbon material, aluminum nitride, boron nitride, and silicon carbide is used as a material of the filler.

Examples of the material of the filler also include metal oxide, such as alumina, boehmite (alumina monohydrate), silica, titania, zirconia, magnesium oxide, tin oxide, zinc oxide, and barium oxide.

One type of filler may be used alone, or two or more types of fillers may be mixed and used.

Examples of the filler of the exemplary embodiment include at least one type of ceramic particles selected from the group consisting of aluminum nitride, boron nitride, and silicon carbide.

Examples of the filler of the exemplary embodiment include carbon fibers, such as carbon nanofibers and carbon nanotubes.

From the viewpoint of a balance between flexibility, durability, thermal conductivity, and the like of the polymer film, it is preferable that a volume fraction of the fillers occupied in the polymer film according to the exemplary embodiment of the present disclosure is, for example, 10% by volume or more and 70% by volume or less.

In the first polymer film, a volume fraction of the fillers is, for example, preferably 10% by volume or more and 70% by volume or less, more preferably 15% by volume or more and 60% by volume or less, and still more preferably 20% by volume or more and 50% by volume or less.

In the second polymer film, a volume fraction of the fillers is, for example, preferably 10% by volume or more and 70% by volume or less, more preferably 20% by volume or more and 65% by volume or less, and still more preferably 30% by volume or more and 60% by volume or less.

A thermal conductivity of the polymer film according to the exemplary embodiment of the present disclosure in the thickness direction is, for example, preferably 1.2 W/m·K or more, more preferably 1.4 W/m·K or more, and still more preferably 1.6 W/m·K or more.

From the viewpoint of a heat storage property, a thermal conductivity of the polymer film according to the exemplary embodiment of the present disclosure in the thickness direction is, for example, preferably 3.5 W/m·K or less, more preferably 3.2 W/m·K or less, and still more preferably 3.0 W/m·K or less.

A method of measuring the thermal conductivity (W/m·K) of the polymer film according to the exemplary embodiment of the present disclosure in the thickness direction is as follows.

The polymer film is cut into a square shape having a size of 2 mm×2 mm, and the cut polymer film is used as a sample for measurement. The thermal diffusivity of the sample is measured at a room temperature (25° C.±3° C.) with a thermal diffusivity measuring device, and the thermal diffusivity, specific heat, and density are multiplied together to calculate the thermal conductivity (W/m·K) of the sample.

An average thickness of the polymer film according to the exemplary embodiment of the present disclosure may be set depending on an intended use, and is, for example, 10 μm or more and 1000 μm or less, 15 μm or more and 800 μm or less, and 20 μm or more and 500 μm or less.

The polymer film according to the exemplary embodiment of the present disclosure may be a flat film or may be a tubular film. Examples of the intended use of the polymer film according to the exemplary embodiment of the present disclosure include a sheet that is installed on an electronic device for the purpose of absorbing or dissipating heat, a tubular fixing member of an image forming apparatus, and the like.

Examples of a method of manufacturing the polymer film according to the exemplary embodiment of the present disclosure include a manufacturing method that sequentially performs the following steps (1) to (3).

Step (1): A resin or rubber and fillers are mixed to prepare coating liquid. A solvent or a dispersion medium is also mixed as needed.

Step (2): A base body is coated with the coating liquid and the coating liquid is dried to form a coating film.

Step (3): The coating film is fired to obtain a polymer film.

In a case where a cylindrical mold is used as the base body in Step (2), a tubular polymer film can be manufactured.

Laminated Film

A laminated film according to an exemplary embodiment of the present disclosure includes the polymer film according to the exemplary embodiment of the present disclosure.

The laminated film according to the exemplary embodiment of the present disclosure may be a laminated film in which only the polymer films according to the exemplary embodiment of the present disclosure are laminated, or may be a laminated film in which the polymer film according to the exemplary embodiment of the present disclosure and another film (for example, a film having releasability) are laminated. In a case where a plurality of polymer films according to the exemplary embodiment of the present disclosure are laminated, the plurality of polymer films may be identical to each other or different from each other in terms of components and/or composition. An adhesive layer may be provided between the respective films that are laminated.

The laminated film according to the exemplary embodiment of the present disclosure may includes one polymer film according to the exemplary embodiment of the present disclosure or may include two or more polymer films according to the exemplary embodiment of the present disclosure.

In a case where the laminated film according to the exemplary embodiment of the present disclosure includes two or more polymer films according to the exemplary embodiment of the present disclosure, the laminated film may be a laminated film in which only the first polymer films are laminated, may be a laminated film in which only the second polymer films are laminated, or may be a laminated film in which the first polymer film and the second polymer film are laminated. An order in which the polymer films are laminated is not limited.

The laminated film according to the exemplary embodiment of the present disclosure may be a flat film or may be a tubular film. Examples of the intended use of the laminated film according to the exemplary embodiment of the present disclosure include a sheet that is installed on an electronic device for the purpose of absorbing or dissipating heat, a tubular fixing member of an image forming apparatus, and the like.

Tubular Fixing Member

A tubular fixing member according to an exemplary embodiment of the present disclosure includes the polymer film according to the exemplary embodiment of the present disclosure.

The tubular fixing member according to the exemplary embodiment of the present disclosure may be a member consisting of only the polymer film according to the exemplary embodiment of the present disclosure, may be a member in which the polymer film according to the exemplary embodiment of the present disclosure and another film are laminated, or may be a member in which a plurality of polymer films according to the exemplary embodiment of the present disclosure are laminated. In a case where a plurality of polymer films according to the exemplary embodiment of the present disclosure are laminated, the plurality of polymer films may be identical to each other or different from each other in terms of components and/or composition.

Examples of the tubular fixing member according to the exemplary embodiment of the present disclosure include an aspect in which a substrate layer, an elastic layer, and a release layer are laminated in this order and at least one of the substrate layer or the elastic layer is the polymer film according to the exemplary embodiment of the present disclosure.

Examples of a preferred aspect of the exemplary embodiment include an aspect in which the substrate layer is the first polymer film and/or the elastic layer is the second polymer film.

FIG. 1 is a schematic cross-sectional view showing an example of a tubular fixing member according to an exemplary embodiment of the present disclosure.

The tubular fixing member 110 shown in FIG. 1 includes a substrate layer 110A, an elastic layer 110B that is provided on the substrate layer 110A, and a release layer 110C that is provided on the elastic layer 110B. An adhesive layer may be provided between the substrate layer 110A and the elastic layer 110B or between the elastic layer 110B and the release layer 110C. At least one of the substrate layer 110A or the elastic layer 110B is the polymer film according to the exemplary embodiment of the present disclosure. It is preferable that the substrate layer 110A is, for example, the first polymer film. It is preferable that the elastic layer 110B is, for example, the second polymer film.

From the viewpoint of durability and thermal conductivity, an average thickness of the substrate layer is, for example, preferably 20 μm or more and 200 μm or less, more preferably 30 μm or more and 150 μm or less, and still more preferably 40 μm or more and 100 μm or less.

From the viewpoint of durability and thermal conductivity, an average thickness of the elastic layer is, for example, preferably 30 μm or more and 500 μm or less, more preferably 50 μm or more and 480 μm or less, and still more preferably 80 μm or more and 450 μm or less.

It is desirable that the release layer contains, for example, a release material having heat resistance. Examples of the release material having heat resistance include a fluororesin. Examples of the fluororesin include a tetrafluoroethylene-perfluoroalkyl vinyl ether copolymer (PFA), polytetrafluoroethylene (PTFE), a tetrafluoroethylene-hexafluoropropylene copolymer (FEP), polyethylene tetrafluoroethylene (ETFE), polyvinylidene fluoride (PVDF), polychlorotrifluoroethylene (PCTFE), vinyl fluoride (PVF), and the like.

Various additives may be contained in the release layer. Examples of the additives include fillers (calcium carbonate and the like), functional fillers (alumina and the like), softeners (paraffin and the like), processing aids (stearic acid and the like), anti-aging agents (amine and the like), cross-linking agents, and the like.

An average thickness of the release layer is, for example, preferably 5 μm or more and 30 μm or less, more preferably 10 μm or more and 25 μm or less, and still more preferably 15 μm or more and 20 μm or less.

The average thickness of the each layer included in the tubular fixing member is an arithmetic average value of the thicknesses of the layer that are measured by an eddy current film thickness meter at a total of 40 points, that is, at 10 points arranged at regular intervals in the axial direction of the tubular fixing member at each of four points arranged at intervals of 90° in the circumferential direction.

Examples of the shape of the tubular fixing member according to the exemplary embodiment of the present disclosure include a cylindrical shape and a belt shape.

The tubular fixing member according to the exemplary embodiment of the present disclosure may be a fixing belt or may be a fixing roller.

Fixing Device

A fixing device according to an exemplary embodiment of the present disclosure includes a first rotating body and a second rotating body that is disposed in contact with an outer surface of the first rotating body, and causes a recording medium in which a toner image is formed on a surface to pass through a contact portion between the first rotating body and the second rotating body to fix the toner image to the recording medium. At least one of the first rotating body or the second rotating body is a rotating body that applies heat to the recording medium and is the tubular fixing member according to the exemplary embodiment of the present disclosure.

Examples of the fixing device according to the exemplary embodiment of the present disclosure include a first exemplary embodiment and a second exemplary embodiment.

A fixing device according to the first exemplary embodiment includes a heating roller and a pressure belt, and at least the heating roller is the tubular fixing member according to the exemplary embodiment of the present disclosure.

A fixing device according to the second exemplary embodiment includes a heating belt and a pressure roller, and at least the heating belt is the tubular fixing member according to the exemplary embodiment of the present disclosure.

First Exemplary Embodiment

Figure 2:
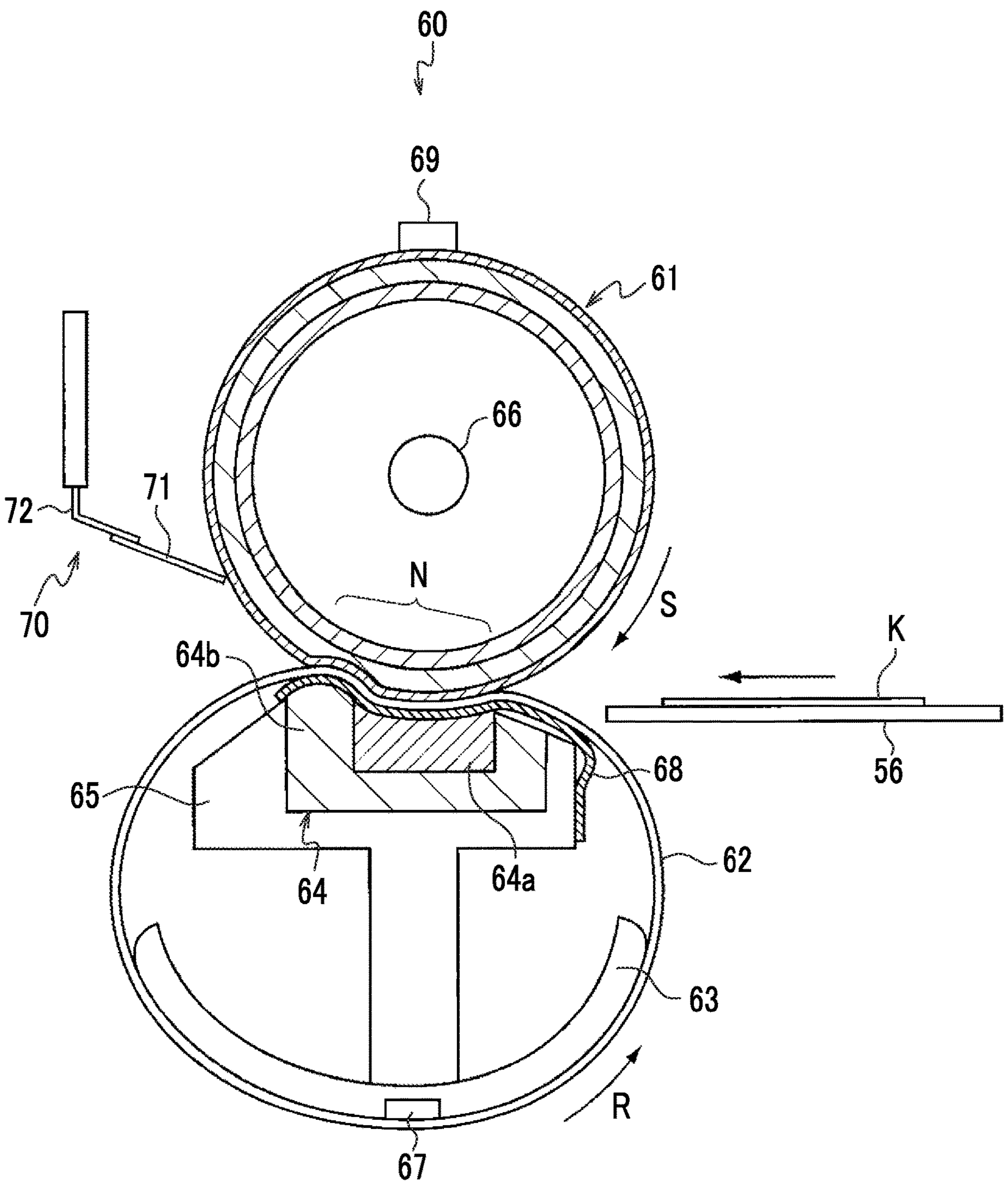
FIG. 2 is a schematic configuration diagram showing an example of a fixing device according to a first exemplary embodiment of the present disclosure.

FIG. 2 is a schematic diagram showing a fixing device 60 according to a first exemplary embodiment.

The fixing device 60 includes a heating roller 61 (an example of the first rotating body) and a pressure belt 62 (an example of the second rotating body).

A halogen lamp 66 (an example of a heating device) is disposed in the heating roller 61. A temperature-sensitive element 69 is disposed in contact with the surface of the heating roller 61. The lighting of the halogen lamp 66 is controlled on the basis of a temperature value measured by the temperature-sensitive element 69, so that the surface temperature of the heating roller 61 is maintained at a target set temperature (for example, 150° C.).

The pressure belt 62 is rotatably supported by a pressing pad 64 and a belt traveling guide 63 that are disposed inside the pressure belt 62.

The pressing pad 64 presses the pressure belt 62 against the heating roller 61. The pressure belt 62 is pressed against the heating roller 61 by the pressing pad 64, so that a nip region N (nip portion) is formed.

The pressing pad 64 includes a nip member 64*a* and a nip member 64*b*. The nip member 64*a* is disposed on the entrance side of the nip region N to ensure a wide nip region N. The nip member 64*b* is disposed on the exit side of the nip region N to cause strain on the heating roller 61 and to facilitate the peeling of a recording medium.

A sheet-like sliding member 68 is disposed between the pressing pad 64 and the pressure belt 62 to reduce sliding resistance between the inner circumferential surface of the pressure belt 62 and the pressing pad 64. The pressing pad 64 and the sliding member 68 are held by a holding member 65 made of metal. The belt traveling guide 63 is mounted on the holding member 65. A lubricant supply device 67, which is a device for supplying a lubricant (oil) to the inner circumferential surface of the pressure belt 62, is mounted on the belt traveling guide 63.

A peeling member 70 is an auxiliary member for peeling off a recording medium from the fixing device 60, and is disposed on the downstream side of the nip region N. The peeling member 70 includes a peeling claw 71 and a holding member 72. The peeling claw 71 is held at a position close to the heating roller 61 by the holding member 72.

The heating roller 61 is rotationally driven by a drive motor (not shown). The heating roller 61 is rotated in a direction of an arrow S by the drive motor, and the pressure belt 62 is rotated in a direction of an arrow R while following the rotation of the heating roller 61. A sheet K (an example of a recording medium) including an unfixed toner image is guided by a guide 56, and is transported to the nip region N. When the sheet K passes through the nip region N, the toner image on the sheet K is fixed by pressure and heat.

Second Exemplary Embodiment

Figure 3:
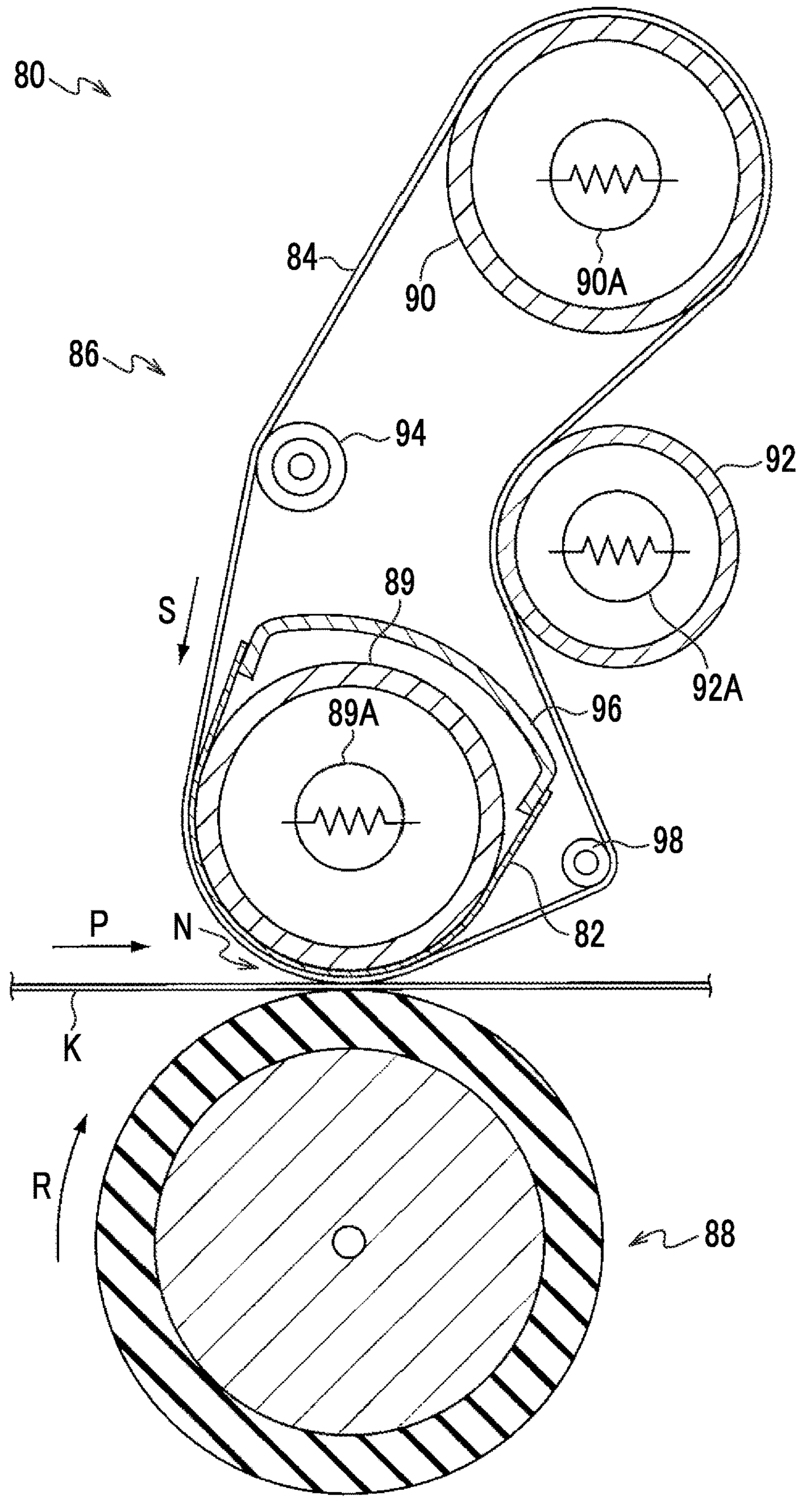
FIG. 3 is a schematic configuration diagram showing an example of a fixing device according to a second exemplary embodiment of the present disclosure.

FIG. 3 is a schematic diagram showing a fixing device 80 according to a second exemplary embodiment.

The fixing device 80 includes a fixing belt module 86 that includes a heating belt 84 (an example of the first rotating body), and a pressure roller 88 (an example of the second rotating body) that is disposed to be pressed against the heating belt 84 (fixing belt module 86).

A nip region N (nip portion) is formed at a contact portion between the heating belt 84 (fixing belt module 86) and the pressure roller 88.

The fixing belt module 86 includes a heating belt 84, a heating pressing roller 89, a support roller 90, a support roller 92, a posture correction roller 94, and a support roller 98. The heating belt 84 is wound around the heating pressing roller 89 and the support roller 90. The heating pressing roller 89 is rotationally driven by a drive motor (not shown), and presses the heating belt 84 against the pressure roller 88 from the inner circumferential surface of the heating belt 84. The support roller 92 is disposed outside the heating belt 84, and defines a circumferential path of the heating belt 84. The posture correction roller 94 corrects the posture of the heating belt 84 between the support roller 90 and the heating pressing roller 89, and suppresses the meandering of the heating belt 84. The support roller 98 applies tension to the heating belt 84 from the inner circumferential surface of the heating belt 84 on the downstream side of the nip region N.

A sheet-like sliding member 82 is disposed between the heating belt 84 and the heating pressing roller 89 to reduce sliding resistance between the inner circumferential surface of the heating belt 84 and the heating pressing roller 89. The sliding member 82 is disposed in a state where both ends of the sliding member 82 are supported by a support member 96.

A halogen heater 89A (an example of a heating device) is disposed in the heating pressing roller 89, and heats the heating belt 84 from the inner circumferential surface side of the heating belt 84.

A halogen heater 90A (an example of a heating device) is disposed in the support roller 90, and heats the heating belt 84 from the inner circumferential surface side of the heating belt 84.

A halogen heater 92A (an example of a heating device) is disposed in the support roller 92, and heats the heating belt 84 from the outer circumferential surface side of the heating belt 84.

The pressure roller 88 is rotatably supported, and is provided to be pressed against a portion of the heating belt 84, which is wound around the heating pressing roller 89, by a biasing unit (not shown). The heating belt 84 is rotationally moved in a direction of an arrow S as the heating pressing roller 89 is rotationally driven, and the pressure roller 88 is rotationally moved in a direction of an arrow R while following the rotational movement of the heating belt 84.

A sheet K (an example of a recording medium) including an unfixed toner image is transported in a direction of an arrow P, and is guided to the nip region N of the fixing device 80. When the sheet K passes through the nip region N, the toner image on the sheet K is fixed by pressure and heat.

Image Forming Apparatus

An image forming apparatus according to an exemplary embodiment of the present disclosure includes an image holding body, a charging device that charges a surface of the image holding body, an electrostatic latent image forming device that forms an electrostatic latent image on the charged surface of the image holding body, a developing device that develops the electrostatic latent image formed on the surface of the image holding body with a developer containing toner to form a toner image, a transfer device that transfers the toner image onto a surface of a recording medium, and the fixing device according to the exemplary embodiment of the present disclosure that fixes the toner image to the recording medium. The fixing device may be a cartridge that can be attached to and detached from the image forming apparatus.

Figure 4:
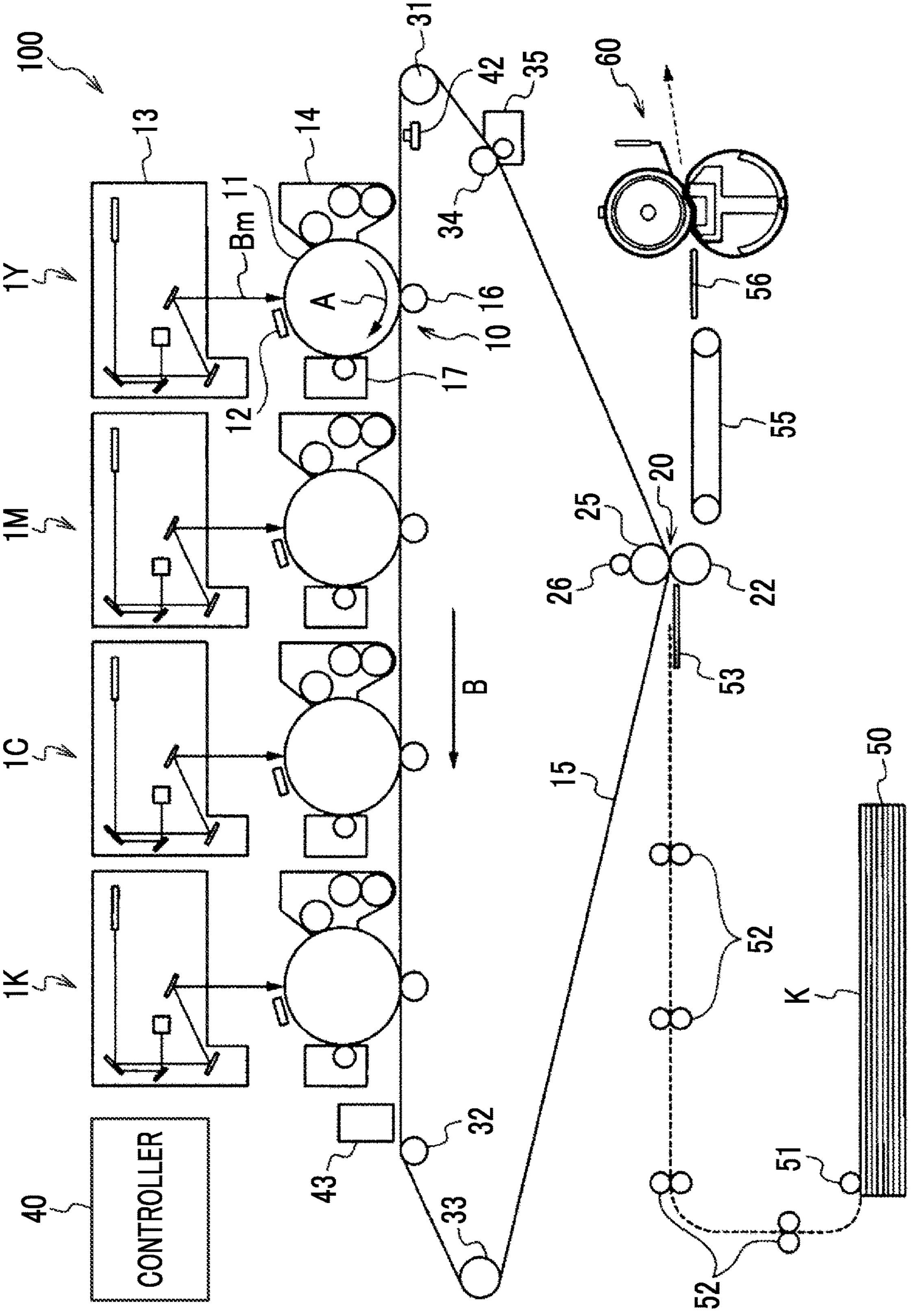
FIG. 4 is a schematic configuration diagram showing an example of an image forming apparatus according to an exemplary embodiment of the present disclosure.

FIG. 4 is a schematic diagram showing the configuration of the image forming apparatus 100 according to the present exemplary embodiment. The image forming apparatus 100 includes the fixing device 60 according to the first exemplary embodiment described above. The image forming apparatus 100 may include the fixing device 80 according to the second exemplary embodiment described above instead of the fixing device 60.

The image forming apparatus 100 is an intermediate transfer image forming apparatus that is generally called a tandem-type image forming apparatus. The image forming apparatus 100 includes image forming units 1Y, 1M, 1C, and 1K in which toner images having the respective colors are formed by an electrophotographic method, primary transfer units 10 that sequentially transfer (primarily transfer) the toner images having the respective colors onto an intermediate transfer belt 15, a secondary transfer unit 20 that collectively transfers (secondarily transfers) superimposed toner images transferred onto the intermediate transfer belt 15 to a sheet K, which is a recording medium, the fixing device 60 that fixes the secondarily transferred images onto the sheet K, and a controller 40 that controls the operation of each device (each unit).

The image forming units 1Y, 1M, 1C, and 1K are substantially linearly arranged in the order of 1Y (unit for yellow), 1M (unit for magenta), 1C (unit for cyan), and 1K (unit for black) from the upstream side of the intermediate transfer belt 15.

Each of the image forming units 1Y, 1M, 1C, and 1K includes a photoreceptor 11 (an example of the image holding body). The photoreceptor 11 is rotated in a direction of an arrow A.

A charging unit 12 (an example of a charging device), a laser exposure unit 13 (an example of an electrostatic latent image forming device), a developing unit 14 (an example of a developing device), a primary transfer roller 16, and a photoreceptor cleaner 17 are sequentially arranged around the photoreceptor 11 in a rotation direction of the photoreceptor 11.

The charging unit 12 charges the surface of the photoreceptor 11.

The laser exposure unit 13 emits an exposure beam Bm to form an electrostatic latent image on the photoreceptor 11.

The developing unit 14 stores toner having each color, and changes the electrostatic latent image formed on the photoreceptor 11 into a visible image with the toner.

The primary transfer roller 16 transfers the toner image formed on the photoreceptor 11 onto the intermediate transfer belt 15 at the primary transfer unit 10.

The photoreceptor cleaner 17 removes residual toner remaining on the photoreceptor 11.

The intermediate transfer belt 15 is a belt made of a material in which an antistatic agent, such as carbon black, is added to a resin, such as polyimide or polyamide. The intermediate transfer belt 15 has a volume resistivity of, for example, $1\times10^{6}$ Ω·cm or more and $1\times10^{14}$ Ω·cm or less and has a thickness of, for example, 0.1 mm.

The intermediate transfer belt 15 is supported by a drive roller 31, a support roller 32, a tension applying roller 33, a back roller 25, and a cleaning back roller 34, and is driven to circulate (is rotated) in a direction of an arrow B according to the rotation of the drive roller 31.

The drive roller 31 is driven by a motor (not shown) having an excellent constant speed property and rotates the intermediate transfer belt 15.

The support roller 32 supports the intermediate transfer belt 15, which substantially linearly extends in an arrangement direction of four photoreceptors 11, together with the drive roller 31.

The tension applying roller 33 applies constant tension to the intermediate transfer belt 15, and functions as a correction roller that suppresses the meandering of the intermediate transfer belt 15.

The back roller 25 is provided in the secondary transfer unit 20, and the cleaning back roller 34 is provided in a cleaning unit that scrapes off residual toner remaining on the intermediate transfer belt 15.

The primary transfer roller 16 is disposed in pressure contact with the photoreceptor 11 with the intermediate transfer belt 15 interposed between the photoreceptor 11 and the primary transfer roller 16, and forms the primary transfer unit 10.

A voltage (primary transfer bias) having a polarity opposite to the charging polarity of the toner (referred to as a negative polarity. The same applies hereinafter.) is applied to the primary transfer roller 16. Accordingly, the toner images formed on the respective photoreceptors 11 are sequentially electrostatically attracted to the intermediate transfer belt 15, so that the superimposed toner images are formed on the intermediate transfer belt 15.

The primary transfer roller 16 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The primary transfer roller 16 has a volume resistivity of, for example, $1\times10^{7.5}$ Ω·cm or more and $1\times10^{8.5}$ Ω·cm or less.

A secondary transfer roller 22 is disposed in pressure contact with the back roller 25 with the intermediate transfer belt 15 interposed between the back roller 25 and the secondary transfer roller 22, and forms the secondary transfer unit 20.

The secondary transfer roller 22 forms a secondary transfer bias between the back roller 25 and the secondary transfer roller 22, and secondarily transfers the toner images onto the sheet K (recording medium) transported to the secondary transfer unit 20.

The secondary transfer roller 22 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The secondary transfer roller 22 has a volume resistivity of, for example, $1\times10^{7.5}$ Ω·cm or more and $1\times10^{8.5}$ Ω·cm or less.

The back roller 25 is disposed on the back side of the intermediate transfer belt 15 to form a counter electrode of the secondary transfer roller 22, and forms a transfer electric field between the secondary transfer roller 22 and the back roller 25.

For example, a rubber substrate is covered with a tube made of blended rubber in which carbon is dispersed, so that the back roller 25 is formed. The back roller 25 has a surface resistivity of, for example, $1\times10^{7}$Ω/□ or more and $1\times10^{10}$Ω/□ or less, and has a hardness of, for example, 70° (Asker C manufactured by Kobunshi Keiki Co., Ltd., The same applies hereinafter).

A power feed roller 26 made of metal is disposed in contact with the back roller 25. The power feed roller 26 applies a voltage (secondary transfer bias) having a polarity identical to the charging polarity of the toner (negative polarity) to form a transfer electric field between the secondary transfer roller 22 and the back roller 25.

An intermediate transfer belt cleaner 35 is provided on the downstream side of the secondary transfer unit 20 of the intermediate transfer belt 15 to be freely attachable to and detachable from the intermediate transfer belt 15. The intermediate transfer belt cleaner 35 removes residual toner and paper dust on the intermediate transfer belt 15 after the secondary transfer.

A reference sensor (home position sensor) 42 is provided on the upstream side of the image forming unit 1Y. The reference sensor 42 generates a reference signal that serves as a reference used to take an image formation timing in each image forming unit. The reference sensor 42 recognizes a mark provided on the back side of the intermediate transfer belt 15 and generates a reference signal, and the image forming units 1Y, 1M, 1C, and 1K start to form images according to an instruction given from the controller 40 that recognizes this reference signal.

An image density sensor 43 used to adjust image quality is provided on the downstream side of the image forming unit 1K.

The image forming apparatus 100 includes a sheet storage part 50, a sheet feed roller 51, transport rollers 52, a transport guide 53, a transport belt 55, and a fixing entrance guide 56 as a transport unit for transporting a sheet K.

The sheet storage part 50 stores sheets K on which images are not yet formed.

The sheet feed roller 51 takes out a sheet K stored in the sheet storage part 50.

The transport rollers 52 transport the sheet K that is taken out by the sheet feed roller 51.

The transport guide 53 sends the sheet K, which is transported by the transport rollers 52, to the secondary transfer unit 20.

The transport belt 55 transports the sheet K, onto which images are transferred at the secondary transfer unit 20, to the fixing device 60.

The fixing entrance guide 56 guides the sheet K to the fixing device 60.

A method of forming an image using the image forming apparatus 100 will be described.

In the image forming apparatus 100, image data output from an image reading device (not shown), a computer (not shown), or the like are subjected to image processing via an image processing device (not shown) and work for forming images is performed by the image forming units 1Y, 1M, 1C, and 1K.

In the image processing device, image processing, such as shading correction, misregistration correction, brightness/color space conversion, gamma correction, frame removal or color editing, and movement editing, is performed on input reflectance data. Image data on which the image processing is performed are converted into coloring material gradation data of four colors, that is, Y, M, C, and K, and are output to the laser exposure units 13.

The laser exposure unit 13 irradiates each of the photoreceptors 11 of the image forming units 1Y, 1M, 1C, and 1K with an exposure beam Bm according to the input coloring material gradation data.

The surface of each of the photoreceptors 11 of the image forming units 1Y, 1M, 1C, and 1K is charged by the charging unit 12 and is then scanned and exposed by the laser exposure unit 13, so that an electrostatic latent image is formed. The electrostatic latent image formed on each photoreceptor 11 is developed as a toner image having each color by each image forming unit.

The toner image formed on each of the photoreceptors 11 of the image forming units 1Y, 1M, 1C, and 1K is transferred onto the intermediate transfer belt 15 at the primary transfer unit 10 where each photoreceptor 11 and the intermediate transfer belt 15 are in contact with each other. At the primary transfer units 10, a voltage (primary transfer bias) having a polarity opposite to the charging polarity of the toner (negative polarity) is applied to the intermediate transfer belt 15 by the primary transfer rollers 16 and toner images are sequentially superimposed and transferred onto the intermediate transfer belt 15.

The toner images primarily transferred onto the intermediate transfer belt 15 are transported to the secondary transfer unit 20 with the movement of the intermediate transfer belt 15.

At a timing when the toner images reach the secondary transfer unit 20, a sheet K stored in the sheet storage part 50 is transported by the sheet feed roller 51, the transport rollers 52, and the transport guide 53, is fed to the secondary transfer unit 20, and is sandwiched between the intermediate transfer belt 15 and the secondary transfer roller 22.

Then, the toner images on the intermediate transfer belt 15 are electrostatically transferred (secondarily transferred) onto the sheet K at the secondary transfer unit 20 where a transfer electric field is formed.

The sheet K onto which the toner images are electrostatically transferred is peeled off from the intermediate transfer belt 15 by the secondary transfer roller 22 and is transported to the fixing device 60 by the transport belt 55.

The sheet K transported to the fixing device 60 is heated and pressed by the fixing device 60, so that the unfixed toner images are fixed.

An image is formed on the recording medium by the image forming apparatus 100 through the above-mentioned steps.

EXAMPLES

The exemplary embodiments of the present disclosure will be described in detail below using examples, but the exemplary embodiments of the present disclosure are not limited to these examples at all.

In the following description, all of "part" and "%" are based on mass unless otherwise specified.

In the following description, synthesis, processing, manufacture, and the like are performed at a room temperature (25° C.±3° C.) unless otherwise specified.

Manufacture of Fixing Belt

Example 1

Formation of Substrate Layer

A polyamic acid solution (TX-HMM, Unitika, Ltd.) and carbon nanotubes are mixed with each other to prepare coating liquid (1). The coating liquid (1) is prepared such that a volume fraction of the carbon nanotubes occupied in a substrate layer is a content shown in Table 1.

An outer circumferential surface of a cylindrical mold (a diameter of 30 mm and a width of 420 mm) made of aluminum is coated with the coating liquid (1), and the coating liquid (1) is dried for 80 minutes at a temperature of 100° C. and is heated and fired for 40 minutes at a temperature of 380° C. A fired layer is detached from the mold to obtain a substrate layer (first polymer film). The amount of coating liquid (1) with which the mold is coated is adjusted such that the thickness of the substrate layer (first polymer film) is 80 μm.

Formation of Elastic Layer

Liquid silicone rubber (two-liquid type, X-34-2826-A/B, Shin-Etsu Chemical Co., Ltd.) and silicon carbide are mixed with each other to prepare coating liquid (2). The coating liquid (2) is prepared such that a volume fraction of the silicon carbide occupied in an elastic layer is 40% by volume.

A cylindrical inner mold is covered with the substrate layer. An outer circumferential surface of the substrate layer is coated with the coating liquid (2), and the coating liquid (2) is dried for 15 minutes at a temperature of 115° C. and is fired for 2 hours at a temperature of 200° C. to form an elastic layer. The amount of coating liquid (2) with which the inner mold is coated is adjusted such that the thickness of the elastic layer is 450 μm.

Formation of Release Layer

A PFA tube, which has an inner diameter of 29.3 mm and an average thickness of 20 m and of which an inner surface is modified by liquid ammonia treatment, is prepared. A laminate including the substrate layer and the elastic layer is covered with the PFA tube. After being covered with the PFA tube, the laminate is fired for 2 hours at a temperature of 200° C. so that the laminate and the PFA tube adhere. Then, the laminate and the PFA tube are detached from the inner mold and are cut to a width of 380 mm. In this way, a fixing belt (the tubular fixing member according to the exemplary embodiment of the present disclosure) is obtained.

Examples 2 to 5 and Comparative Examples 1 to 3

A fixing belt (the tubular fixing member according to the exemplary embodiment of the present disclosure) is manufactured in a manner identical to the manner of Example 1 except that a resin and/or fillers used for the formation of the substrate layer (first polymer film) are changed to specifications shown in Table 1. In a case where polystyrene or polyethylene is used as the resin for the substrate layer, the substrate layer is formed by injection molding.

Example 11

Formation of Substrate Layer

A polyamic acid solution (TX-HMM, Unitika, Ltd.) and carbon nanotubes are mixed with each other to prepare coating liquid (11). The coating liquid (11) is prepared such that a volume fraction of the carbon nanotubes occupied in a substrate layer is 20% by volume.

An outer circumferential surface of a cylindrical mold (a diameter of 30 mm and a width of 420 mm) made of aluminum is coated with the coating liquid (11), and the coating liquid (11) is dried for 80 minutes at a temperature of 100° C. and is heated and fired for 40 minutes at a temperature of 380° C. A fired layer is detached from the mold to obtain a substrate layer. The amount of coating liquid (11) with which the mold is coated is adjusted such that the thickness of the substrate layer is 80 μm.

Formation of Elastic Layer

Liquid silicone rubber (two-liquid type, X-34-2826-A/B, Shin-Etsu Chemical Co., Ltd.) and silicon carbide are mixed with each other to prepare coating liquid (12). The coating liquid (12) is prepared such that a volume fraction of the silicon carbide occupied in an elastic layer is a content shown in Table 2.

A cylindrical inner mold is covered with the substrate layer. An outer circumferential surface of the substrate layer is coated with the coating liquid (12), and the coating liquid (12) is dried for 15 minutes at a temperature of 115° C. and is fired for 2 hours at a temperature of 200° C. to form an elastic layer (second polymer film). The amount of coating liquid (12) with which the inner mold is coated is adjusted such that the thickness of the elastic layer is 450 μm.

Formation of Release Layer

A PFA tube, which has an inner diameter of 29.3 mm and an average thickness of 20 μm and of which an inner surface is modified by liquid ammonia treatment, is prepared. A laminate including the substrate layer and the elastic layer is covered with the PFA tube. After being covered with the PFA tube, the laminate is fired for 2 hours at a temperature of 200° C. so that the laminate and the PFA tube adhere. Then, the laminate and the PFA tube are detached from the inner mold and are cut to a width of 380 mm. In this way, a fixing belt (the tubular fixing member according to the exemplary embodiment of the present disclosure) is obtained.

Examples 12 to 14 and Comparative Examples 11 and 12

A fixing belt (the tubular fixing member according to the exemplary embodiment of the present disclosure) is manufactured in a manner identical to the manner of Example 11 except that fillers used for the formation of the elastic layer (second polymer film) are changed to specifications shown in Table 2.

Physical Properties of Polymer Film

With regard to physical properties of the polymer films, the substrate layers (first polymer films) of Example 1 and the like are objects to be measured and the elastic layers (second polymer films) of Example 11 and the like are objects to be measured. Measurement results are shown in Tables 1 and 2.

Average Maximum Length of Fillers

A cross section of the fixing belt taken in the thickness direction is prepared, and a cross section of the substrate layer or the elastic layer is observed with a scanning electron microscope (SEM). 100 fillers are selected, a maximum value of a distance between two arbitrary points positioned on an outline of each filler is measured, and an average value of the maximum values obtained from the 100 fillers is calculated.

Density of Polymer Film

The substrate layer or the elastic layer is peeled off from the fixing belt.

The density (g/cm$^3$) of the substrate layer is measured according to an underwater substitution method of JISK7112:1999 "Plastics—Methods of determining the density and relative density of non-cellular plastics". New distilled water that contains 0.1% by mass or less of a wetting agent to remove air bubbles is used as a dipping solution.

The density (g/cm$^3$) of the elastic layer is measured according to an "A method" of JISK6268:1998 "vulcanized rubber-density measurement".

Thermal Conductivity

The substrate layer or the elastic layer is peeled off from the fixing belt. The substrate layer or the elastic layer is cut into a square shape having a length of 2 mm in an axial direction and a length of 2 mm in a circumferential direction, and the cut substrate layer or the cut elastic layer is used as a sample for measurement. The thermal diffusivity of the sample is measured at a room temperature (25° C.±3° C.) using a thermal diffusivity measuring device ai-phase (ai-Phase Co., Ltd.), and the thermal diffusivity, specific heat, and density are multiplied together to calculate the thermal conductivity (W/m·K) of the sample.

Heat Capacity

The substrate layer or the elastic layer is peeled off from the fixing belt. The heat capacity of the substrate layer or the elastic layer is measured according to JISK7123:2012 "Testing methods for specific heat capacity of plastics", and is converted into heat capacity (J/K) per unit area (1 m$^2$).

It is desirable that heat capacity is, for example, 1000 J/K or more in this example.

Storage Elastic Modulus

The elastic layer is peeled off from the fixing belt. The elastic layer is cut into a rectangular shape having a size of 20 mm×4 mm, and the cut elastic layer is used as a sample for measurement. The sample is placed on a dynamic viscoelasticity measuring device; and the dynamic viscoelasticity of the sample is measured under conditions of a temperature of 30° C., a frequency of 10 Hz, a load of 10 gf, and an amplitude of 10 μm to obtain the storage elastic modulus (MPa) of the sample.

Performance Evaluation of Fixing Belt

Fixing Property on Thick Paper

The fixing belt is mounted on an image forming apparatus (Versant3100i Press, FUJIFILM Business Innovation Corp.). A solid black image is output to 100 sheets of thick paper (COLOR COPY (A4, 350 g), MONDI Co., Ltd.) having an A4 size. The fixing of the image is visually observed, the image is then rubbed by hand to observe the occurrence of image defects, such as the collapse and blurring of an image, and a fixing property is classified as follows. Evaluation results are shown in Tables 1 and 2.

A: No image defect is observed on 100 sheets.

B: Image defects are observed on 1 to 19 sheets.

C: Image defects are observed on 20 or more sheets.

D: There are one or more sheets of paper to which the image is not fixed.

TABLE 1

| | Substrate layer (first polymer film) | | | | | | | Fixing member |
|---|---|---|---|---|---|---|---|---|
| | | Filler | | First polymer film | | | | Fixing property on thick paper |
| | Resin Type — | Type — | Content % by volume | Average maximum length of fillers µm | Density $g/cm^3$ | Thermal conductivity W/m · k | Heat capacity J/K | — |
| Example 1 | Polyimide | Carbon nanotube | 20 | 6 | 1.56 | 3.0 | 1010 | A |
| Example 2 | Polyimide | Boron nitride | 25 | 8 | 1.64 | 2.8 | 1048 | A |
| Example 3 | Polyimide | Aluminum nitride | 25 | 2 | 1.89 | 2.0 | 1028 | A |
| Example 4 | Polyamideimide | Aluminum nitride | 20 | 2 | 1.69 | 1.5 | 1216 | B |
| Example 5 | Polystyrene | Carbon nanotube | 20 | 6 | 1.27 | 1.5 | 1202 | B |
| Comparative Example 1 | Polyimide | Aluminum nitride | 25 | 15 | 1.89 | 1.2 | 1028 | C |
| Comparative Example 2 | Polyimide | Alumina | 25 | 2 | 2.07 | 0.6 | 1043 | C |
| Comparative Example 3 | Polyethylene | Carbon black | 5 | 0.5 | 0.99 | 0.6 | 2221 | D |

TABLE 2

| | Elastic layer (second polymer film) | | | | | | | | Fixing member |
|---|---|---|---|---|---|---|---|---|---|
| | | filler | | Second polymer film | | | | | Fixing property on thick paper |
| | Rubber Type — | Type — | Content % by volume | Average maximum length of fillers µm | Density $g/cm^3$ | Thermal conductivity W/m · k | Heat capacity J/K | Storage elastic modulus MPa | — |
| Example 11 | Si rubber | Silicon carbide | 40 | 7 | 1.86 | 1.6 | 1018 | 1.7 | A |
| Example 12 | Si rubber | Carbon nanotube | 40 | 6 | 1.41 | 2.5 | 1220 | 1.2 | A |
| Example 13 | Si rubber | Alumina | 50 | 4 | 2.47 | 1.5 | 1190 | 1.6 | A |
| Example 14 | Si rubber | Metallic silicon | 30 | 8 | 1.43 | 1.2 | 1277 | 1.3 | B |
| Comparative Example 11 | Si rubber | Aluminum nitride | 40 | 15 | 1.87 | 1.0 | 1248 | 1.5 | C |
| Comparative Example 12 | Si rubber | Red iron oxide | 60 | 0.05 | 3.52 | 0.5 | 917 | 2.6 | D |

The polymer film, the laminated film, the tubular fixing member, the fixing device, and the image forming apparatus according to the exemplary embodiments of the present disclosure include the following aspects.

((((1))))

A polymer film comprising:

at least one type of polymer selected from a resin; and fillers dispersed in the polymer, wherein an average maximum length of the fillers in a cross section of the polymer film taken in a thickness direction is 10 µm or less, and density of the polymer film is 1.0 $g/cm^3$ or more and 2.0 $g/cm^3$ or less.

(((2)))

A polymer film comprising:

at least one type of polymer selected from rubber; and fillers dispersed in the polymer, wherein an average maximum length of the fillers in a cross section of the polymer film taken in a thickness direction is 10 µm or less, and density of the polymer film is 1.3 $g/cm^3$ or more and 2.6 $g/cm^3$ or less.

((((3))))

The polymer film according to (((1))), wherein the resin includes a polyimide resin, and density of the polymer film is 1.4 $g/cm^3$ or more and 2.0 $g/cm^3$ or less.

((((4))))

The polymer film according to (((2))), wherein a storage elastic modulus of the polymer film is 0.5 MPa or more and 2.5 MPa or less.

((((5))))

The polymer film according to any one of (((1))) to (((4))), wherein the fillers include at least one type of ceramic particles selected from the group consisting of aluminum nitride, boron nitride, and silicon carbide.

(((6)))

The polymer film according to any one of (((1))) to (((5))), wherein the fillers include carbon fibers.

(((7)))

The polymer film according to any one of (((1))) to (((6))), wherein a volume fraction of the fillers occupied in the polymer film is 10% by volume or more and 70% by volume or less.

((((8))))

The polymer film according to any one of (((1))) to (((7))), wherein a thermal conductivity of the polymer film in the thickness direction is 1.2 W/m·K or more.

((((9))))

A laminated film comprising:

at least one selected from the group consisting of the polymer film according to (((1))), the polymer film according to (((2))), the polymer film according to (((3))), the polymer film according to (((4))), the polymer film according to (((5))), the polymer film according to (((6))), the polymer film according to (((7))), and the polymer film according to (((8))).

((((10))))

A tubular fixing member comprising:

a substrate layer, an elastic layer, and a release layer laminated in this order, wherein at least one of the substrate layer or the elastic layer is the polymer film according to any one of (((1))) to (((8))).

(((11)))

A fixing device comprising:

a first rotating body; and a second rotating body that is disposed in contact with an outer surface of the first rotating body, wherein at least one of the first rotating body or the second rotating body is the tubular fixing member according to (((10))), and a recording medium having a surface on which a toner image is formed passes through a contact portion between the first rotating body and the second rotating body to fix the toner image.

(((12)))

An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to (((11))) that fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polymer film comprising:

at least one type of polymer selected from a resin; and fillers dispersed in the polymer, wherein an average maximum length of the fillers in a cross section of the polymer film taken in a thickness direction is 10 μm or less, a thermal conductivity of the polymer film in the thickness direction is 1.5 W/m·K or more, and density of the polymer film is 1.0 g/cm$^3$ or more and 2.0 g/cm$^3$ or less.

2. A polymer film comprising:

at least one type of polymer selected from rubber; and fillers dispersed in the polymer, wherein an average maximum length of the fillers in a cross section of the polymer film taken in a thickness direction is 10 μm or less, a thermal conductivity of the polymer film in the thickness direction is 1.2 W/m·K or more, and density of the polymer film is 1.3 g/cm$^3$ or more and 2.6 g/cm$^3$ or less.

3. The polymer film according to claim 1, wherein the resin includes a polyimide resin, and density of the polymer film is 1.4 g/cm$^3$ or more and 2.0 g/cm$^3$ or less.

4. The polymer film according to claim 2, wherein a storage elastic modulus of the polymer film is 0.5 MPa or more and 2.5 MPa or less.

5. The polymer film according to claim 1, wherein the fillers include at least one type of ceramic particles selected from the group consisting of aluminum nitride, boron nitride, and silicon carbide.

6. The polymer film according to claim 2, wherein the fillers include at least one type of ceramic particles selected from the group consisting of aluminum nitride, boron nitride, and silicon carbide.

7. The polymer film according to claim 1, wherein the fillers include carbon fibers.

8. The polymer film according to claim 2, wherein the fillers include carbon fibers.

9. The polymer film according to claim 1, wherein a volume fraction of the fillers occupied in the polymer film is 10% by volume or more and 70% by volume or less.

10. The polymer film according to claim 2, wherein a volume fraction of the fillers occupied in the polymer film is 10% by volume or more and 70% by volume or less.

11. A laminated film comprising:

the polymer film according to claim 1.

12. A laminated film comprising:

the polymer film according to claim 2.

13. A tubular fixing member comprising:

a substrate layer, an elastic layer, and a release layer laminated in this order, wherein at least one of the substrate layer or the elastic layer is the polymer film according to claim 1.

14. A tubular fixing member comprising:

a substrate layer, an elastic layer, and a release layer laminated in this order, wherein at least one of the substrate layer or the elastic layer is the polymer film according to claim 2.

15. A fixing device comprising:

a first rotating body; and a second rotating body that is disposed in contact with an outer surface of the first rotating body, wherein at least one of the first rotating body or the second rotating body is the tubular fixing member according to claim 13, and a recording medium having a surface on which a toner image is formed passes through a contact portion between the first rotating body and the second rotating body to fix the toner image.

16. A fixing device comprising:

a first rotating body; and a second rotating body that is disposed in contact with an outer surface of the first rotating body, wherein at least one of the first rotating body or the second rotating body is the tubular fixing member according to claim 14, and a recording medium having a surface on which a toner image is formed passes through a contact portion between the first rotating body and the second rotating body to fix the toner image.

17. An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to claim 15 that fixes the toner image to the recording medium.

18. An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to claim 16 that fixes the toner image to the recording medium.

* * * * *